United States Patent
Amoo Zadeh et al.

(10) Patent No.: US 10,873,100 B2
(45) Date of Patent: Dec. 22, 2020

(54) NANOCOMPOSITE MEMBRANE FOR DIRECT METHANOL FUEL CELLS

(71) Applicants: Ali Amoo Zadeh, Semnan (IR); Hourieh Mazdarani, Semnan (IR); Hossein Beydaghi, Tehran (IR); Elham Tabrizian, Semnan (IR); Mehran Javanbakht, Tehran (IR)

(72) Inventors: Ali Amoo Zadeh, Semnan (IR); Hourieh Mazdarani, Semnan (IR); Hossein Beydaghi, Tehran (IR); Elham Tabrizian, Semnan (IR); Mehran Javanbakht, Tehran (IR)

( * ) Notice: Subject to any disclaimer, the term of this patent is extended or adjusted under 35 U.S.C. 154(b) by 92 days.

(21) Appl. No.: 16/109,347

(22) Filed: Aug. 22, 2018

(65) Prior Publication Data

US 2019/0140300 A1    May 9, 2019

Related U.S. Application Data

(60) Provisional application No. 62/548,410, filed on Aug. 22, 2017.

(51) Int. Cl.
*H01M 8/1048* (2016.01)
*H01M 8/1081* (2016.01)
(Continued)

(52) U.S. Cl.
CPC ...... *H01M 8/1048* (2013.01); *B01D 67/0013* (2013.01); *B01D 67/0079* (2013.01);
(Continued)

(58) Field of Classification Search
CPC ............. H01M 8/1048; H01M 8/1011; H01M 8/1081; B01D 67/0013; B01D 67/0079; B01D 71/52; B01D 71/82
(Continued)

(56) References Cited

U.S. PATENT DOCUMENTS

2008/0085441 A1*  4/2008  Lee ............... H01M 8/04186
                                                 429/483

OTHER PUBLICATIONS

Kalappa et al., Proton conducting membranes based on sulfonated poly(ether ether ketone)/TiO₂ nanocomposites for a direct methonal fuel cell, Dec. 2006, Polymer International, 56, 371-375 (Year: 2006).*

(Continued)

*Primary Examiner* — Sean P Cullen
(74) *Attorney, Agent, or Firm* — Bajwa IP Law Firm; Haris Zaheer Bajwa

(57) ABSTRACT

A method for synthesizing a nanocomposite membrane, and a synthesized nanocomposite membrane made thereby. The method may include steps of preparing $Fe_3O_4$-tolylene diisocyanate (TDI) nanoparticles by reacting $Fe_3O_4$ nanoparticles and TDI powder, preparing $Fe_3O_4$-TDI-$TiO_2$ nanoparticles, sulfonating the $Fe_3O_4$-TDI-$TiO_2$ nanoparticles, preparing a first polymer solution, dispersing the $Fe_3O_4$-TDI-$TiO_2$—$SO_3H$ nanoparticles into the first polymer solution to obtain a second homogenous solution, and casting and drying the second homogenous solution to obtain the nanocomposite membrane.

10 Claims, 10 Drawing Sheets

(51) Int. Cl.
| | |
|---|---|
| *H01M 8/1011* | (2016.01) |
| *B01D 67/00* | (2006.01) |
| *B01D 71/82* | (2006.01) |
| *B01D 71/52* | (2006.01) |
| *H01M 8/1018* | (2016.01) |
| *B01D 71/68* | (2006.01) |
| *B01D 71/02* | (2006.01) |
| *B01D 71/34* | (2006.01) |
| *B01D 71/38* | (2006.01) |

(52) U.S. Cl.
CPC ............ *B01D 71/52* (2013.01); *B01D 71/82* (2013.01); *H01M 8/1011* (2013.01); *H01M 8/1081* (2013.01); *B01D 71/024* (2013.01); *B01D 71/34* (2013.01); *B01D 71/38* (2013.01); *B01D 71/68* (2013.01); *H01M 2008/1095* (2013.01); *H01M 2300/0082* (2013.01); *H01M 2300/0091* (2013.01)

(58) Field of Classification Search
USPC ........................... 429/493, 495, 535
See application file for complete search history.

(56) References Cited

OTHER PUBLICATIONS

Ammozadeh et al., Novel nanocomposite membrane based on $Fe_3O_4$@TDI@$TiO_2$—$SO_3H$: hydration, mechanical and DMFC study, Sep. 2018, New Journal of Chemistry, 42, 16855-16862 (Year: 2018).*

Tabrizian et al., A new type of $SO_3H$-functionalized magnetic-titania as a robust magnetically-recoverable solid acid catalyst for multi-component reactions, Sep. 2016, RSC Advances, 96606-96615 (Year: 2016).*

Tabrizian et al., A unique approach to magnetization of metal oxides: nano-$Fe_3O_4$@TDI@$TiO_2$ as a highly efficient, magnetically separable and recyclable heterogeneous nanocatalyst, May 2016, Catalysis Science and Technology, 6, 6267-6276 (Year: 2016).*

Amoozadeh et al., $TiO_2$-coated magnetite nanoparticle-supported sulfonic acid as a new efficient, magnetically separable and reusable heterogeneous solid acid catalyst for multicomponent reactions, May 2015, RSC Advances, 5, 45974-45982 (Year: 2015).*

* cited by examiner

NANOCOMPOSITE MEMBRANE FOR DIRECT METHANOL FUEL CELLS

CROSS-REFERENCE TO RELATED APPLICATION

This application claims the benefit of priority from U.S. Provisional Patent Application Ser. No. 62/548,410, filed on Aug. 22, 2017, and entitled "NANOCOMPOSITE MEMBRANE FOR DIRECT METHANOL FUEL CELLS," which is incorporated herein by reference in its entirety.

TECHNICAL FIELD

The present disclosure generally relates to nanocomposite membranes, and particularly to a method for synthesizing a nanocomposite polymer electrolyte membrane for direct methanol fuel cells, and a synthesized nanocomposite membrane made thereby.

BACKGROUND

Fuel cells provide a sustainable approach in addressing the ongoing energy crisis and associated environmental concerns. Fuel cells may be used as sources of power for a wide range of applications that require clean, quiet, and efficient portable power. Fuel cells convert the chemical potential energy of a fuel into electrical energy via an electrochemical reaction. A fuel cell may include a cathode and an anode, as well as a proton exchange membrane ("PEM"). Nafion has a good balance of properties appropriate for fuel cells such as high proton conductivity, flexibility, chemical stability and mechanical toughness, and consequently has become the most commonly-used fuel cell membrane material. However, high methanol crossover, low proton conductivity at temperature above 80° C., and high cost are the main disadvantages of Nafion In order to overcome the disadvanatages of Nafion, blend and composite membranes may be synthesized by using inorganic materials, such as $La_2Ce_2O_7$, $Fe_2TiO_5$, montmorillonite, silica immobilized phosphotungstic acid (Si-PWA) and alternative organic polymers, such as sulfonated polyphtalazinone (SPP), polybenzimidazole (PBI), sulfonated poly (ether sulfone) (SPES), poly(vinyl alcohol) (PVA), sulfonated poly(ether ether ketone) (SPEEK). The hydrophilic nature of the aforementioned inorganic additives may help improve water uptake of the membrane and increase the proton conductivity.

There is a need for improving mechanical stability of the blend and composite membranes, as well as the methanol resistance of the composite membranes utilized in direct methanol fuel cells (DMFCs).

SUMMARY

In one general aspect, the present disclosure is directed to a method for synthesizing a nanocomposite membrane, and a synthesized nanocomposite membrane made thereby. The method may include preparing $Fe_3O_4$-tolylene di-isocyanate (TDI) nanoparticles by reacting $Fe_3O_4$ nanoparticles and TDI powder. Reacting $Fe_3O_4$ nanoparticles and TDI powder may include dissolving $Fe_3O_4$ nanoparticles and TDI powder in a first dried solvent to obtain a mixture, and stirring the mixture under an inert atmosphere at an elevated temperature to obtain an $Fe_3O_4$-TDI powder. The method may further include preparing $Fe_3O_4$-TDI-$TiO_2$ nanoparticles by dispersing the $Fe_3O_4$-TDI powder in a second dried solvent to obtain a first dispersion, adding $TiO_2$ nanoparticles to the first dispersion, and heating the first dispersion under continuous stirring. The method may further include sulfonating the $Fe_3O_4$-TDI-$TiO_2$ nanoparticles by dispersing the $Fe_3O_4$-TDI-$TiO_2$ in a third dried solvent to obtain a second dispersion, adding chlorosulfonic acid to the second dispersion in a drop-wise manner, and removing the dried toluene under a reduced pressure to obtain $Fe_3O_4$-TDI-$TiO_2$—$SO_3H$ nanoparticles. The method may further include preparing a first polymer solution, dispersing the $Fe_3O_4$-TDI-$TiO_2$—$SO_3H$ nanoparticles into the first polymer solution to obtain a second homogenous solution, and casting and drying the second homogenous solution to obtain the nanocomposite membrane.

According to some implementations, dissolving $Fe_3O_4$ nanoparticles and TDI powder in the first dried solvent may include dissolving $Fe_3O_4$ nanoparticles and TDI powder in the first dried solvent with an $Fe_3O_4$ to TDI ratio ($Fe_3O_4$:TDI) of between 6:10 and 8:10.

According to some implementations, stirring the mixture under an inert atmosphere at an elevated temperature to obtain an $Fe_3O_4$-TDI powder may include stirring the mixture at a temperature of approximately 95° C. for about 20 hours under a nitrogen atmosphere.

According to some implementations, dispersing the $Fe_3O_4$-TDI powder in the second dried solvent to obtain the first dispersion may include dispersing the $Fe_3O_4$-TDI powder in the second dried solvent to obtain the first dispersion with a concentration range of 0.0067 to 0.01 g/mL.

According to some implementations, adding $TiO_2$ nanoparticles to the first dispersion may include adding $TiO_2$ nanoparticles to the first dispersion with a $TiO_2$ to $Fe_3O_4$-TDI ratio ($TiO_2$:$Fe_3O_4$-TDI) of approximately 3:10.

According to some implementations, heating the first dispersion under continuous stirring may include heating the first dispersion at a temperature of approximately 110° C. for about 48 hours under continuous stirring.

According to some implementations, dispersing the $Fe_3O_4$-TDI-$TiO_2$ in the third dried solvent to obtain the second dispersion may include dispersing the $Fe_3O_4$-TDI-$TiO_2$ in the third dried solvent in an amount to obtain the second dispersion with a concentration between 0.05 and 0.067 g/mL.

According to some implementations, adding chlorosulfonic acid to the second dispersion in a drop-wise manner may include drop-wise addition of chlorosulfonic acid to the second dispersion with an addition rate of between 0.008 and 0.01 mL/min.

According to some implementations, preparing the first polymer solution may include dissolving a polymer in a fourth solvent, the polymer comprising one of polyphtalazinone (SPP), sulfonated polyphtalazinone ether ketone (SP-PEK), sulfonated poly(ether sulfone) (SPES), and poly (vinyl alcohol) (PVA), sulfonated poly vinylidene fluoride (SPVDF), the fourth solvent comprising one of DMAc, N-methyl-2-pyrrolidone (NMP), and dimethyl sulfoxide (DMSO).

According to some implementations, dispersing the $Fe_3O_4$-TDI-$TiO_2$—$SO_3H$ nanoparticles into the first polymer solution to obtain the second homogenous solution includes dispersing the $Fe_3O_4$-TDI-$TiO_2$—$SO_3H$ nanoparticles into the first polymer solution to obtain the second homogenous solution with a concentration of between 3 and 7 wt % based on the total weight of the second homogeneous solution.

BRIEF DESCRIPTION OF THE DRAWINGS

The drawing figures depict one or more implementations in accord with the present teachings, by way of example

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

The disclosed methods and techniques are directed to a method for preparing a nanocomposite membrane and application of the prepared nanocomposite membrane in direct methanol fuel cells (DMFCs). The disclosed methods may include fabricating sulfonated magnetic titanium dioxide nanoparticles and then utilizing the fabricated nanoparticles to prepare nanocomposite membranes. The sulfonated magnetic titanium dioxide nanoparticles are inorganic-organic hybrids that may combine the characters of organic moieties (e.g., flexibility and ductility) and inorganic moieties (e.g., rigidity and thermal stability) in the nanocomposite polymeric membrane, and increase the mechanical properties of the nanocomposite membrane significantly. Moreover, the presence of $SO_3H$ and OH groups in the structure of the nanoparticles may result in the formation of strong and numerous hydrogen bonds within the nanocomposite membrane, creating a solid network structure that may help proton transfer through the membrane and also improve mechanical properties. Due to its high mechanical properties, proper water absorption, low methanol permeability and high proton conductivity, the disclosed nanocomposite membrane may be used in DMFCs.

Figure 1:
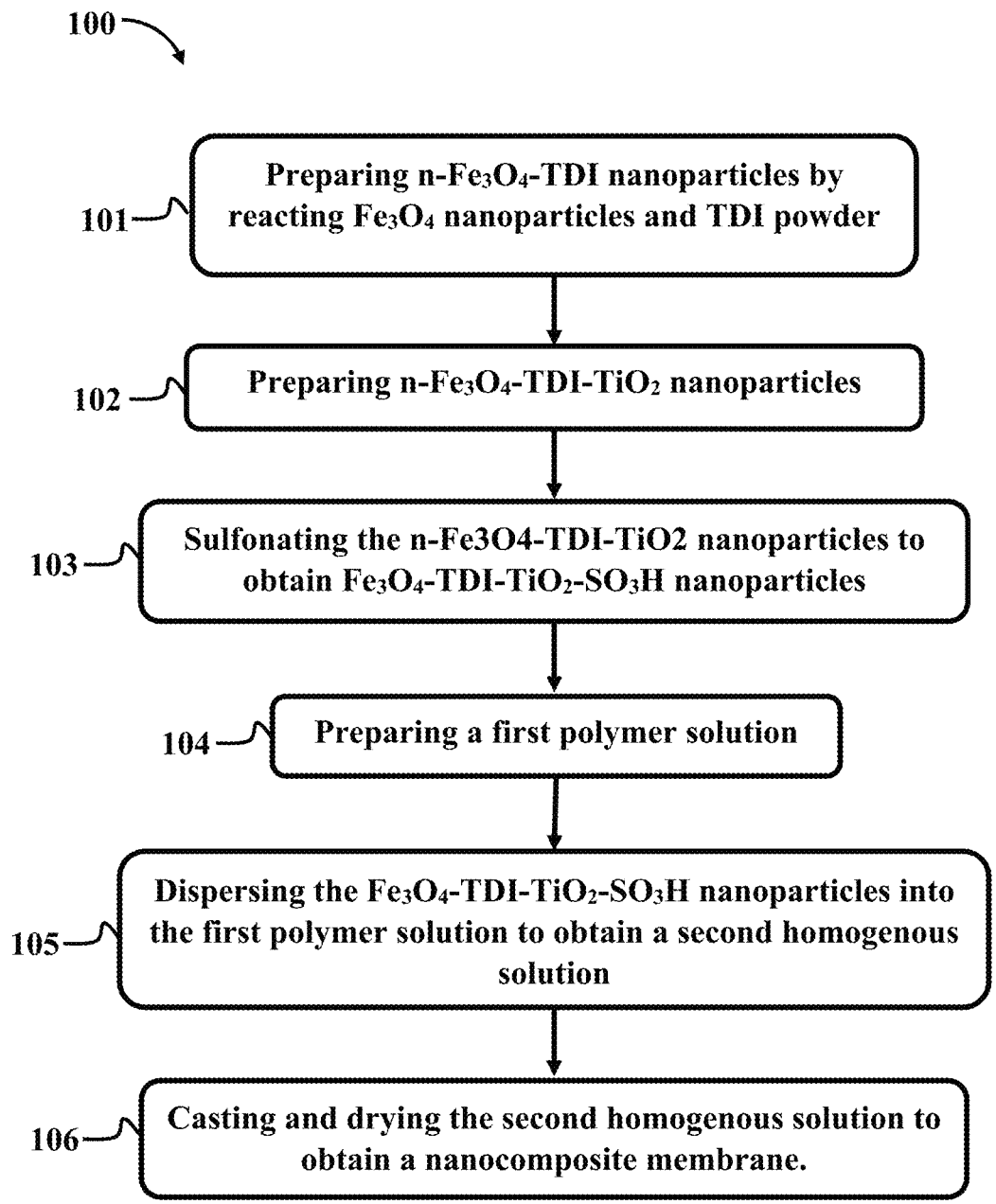
FIG. 1 illustrates a flowchart of an implementation of a method for synthesizing a nanocomposite membrane.

FIG. 1 illustrates a flowchart of an implementation of a method 100 for synthesizing a nanocomposite membrane. The method 100 may include a step 101 of preparing $Fe_3O_4$-TDI nanoparticles by reacting $Fe_3O_4$ nanoparticles and toluene di-isocyanate (TDI) powder; a step 102 of preparing $Fe_3O_4$-TDI-$TiO_2$ nanoparticles; a step 103 of sulfonating the $Fe_3O_4$-TDI-$TiO_2$ nanoparticles to obtain $Fe_3O_4$-TDI-$TiO_2$—$SO_3H$ nanoparticles; a step 104 of preparing a first polymer solution; a step 105 of dispersing the $Fe_3O_4$-TDI-$TiO_2$—$SO_3H$ nanoparticles into the first polymer solution to obtain a second homogenous solution; and a step 106 of casting and drying the second homogenous solution to obtain a nanocomposite membrane.

Referring to FIG. 1, according to one or more implementations, the step 101 of preparing $Fe_3O_4$-TDI nanoparticles by reacting $Fe_3O_4$ nanoparticles and TDI powder may include reacting $Fe_3O_4$ nanoparticles and TDI powder by dissolving $Fe_3O_4$ nanoparticles and TDI powder in a first dried solvent, such as dichloromethane, toluene acetone, benzene, ethyl acetate, and carbon tetrachloride to obtain a mixture, and stirring the mixture under an inert atmosphere at an elevated temperature to obtain $Fe_3O_4$-TDI nanoparticles.

According to an implementation, dissolving $Fe_3O_4$ nanoparticles and TDI powder in the first dried solvent may include dissolving $Fe_3O_4$ nanoparticles and TDI powder in the first dried solvent with a $Fe_3O_4$ to TDI ratio ($Fe_3O_4$:TDI) between 6:10 and 8:10 in an ultrasonic bath for 10 to 15 minutes to obtain the mixture. In an implementation, stirring the mixture under an inert atmosphere at an elevated temperature may include stirring the mixture at a temperature of approximately 95° C. for about 20 hours under a nitrogen atmosphere to obtain $Fe_3O_4$-TDI nanoparticles as a powder. The obtained $Fe_3O_4$-TDI nanoparticles may further be magnetically separated from the mixture, washed, and dried. In an example, the obtained $Fe_3O_4$-TDI nanoparticles may be washed with a dried solvent for removing the unreacted and physically absorbed TDI. After that, the obtained $Fe_3O_4$-TDI nanoparticles may be dried under vacuum at a temperature of approximately 100° C. for about 4 hours.

Referring to FIG. 1, according to one or more implementations, the step 102 of preparing $Fe_3O_4$-TDI-$TiO_2$ nanoparticles may include preparing the $Fe_3O_4$-TDI-$TiO_2$ nanoparticles by dispersing the $Fe_3O_4$-TDI powder in a second dried solvent, such as dichloromethane, toluene acetone, benzene, ethyl acetate, and carbon tetrachloride to obtain a first dispersion; adding $TiO_2$ nanoparticles to the first dispersion; and heating the first dispersion under continuous stirring. According to some implementations, the first dispersion may have a concentration range of 0.0067 to 0.01 g/mL. According to other implementations, adding $TiO_2$ nanoparticles to the first dispersion may include adding $TiO_2$ nanoparticles to the first dispersion with a $TiO_2$ to $Fe_3O_4$-TDI ratio ($TiO_2$:$Fe_3O_4$-TDI) of approximately 3:10.

According to an implementation, heating the first dispersion under continuous stirring may include heating the first dispersion at a temperature of approximately 110° C. for about 48 hours under continuous stirring. According to another implementation, preparing the $Fe_3O_4$-TDI-$TiO_2$ nanoparticles may further include magnetically separating the prepared $Fe_3O_4$-TDI-$TiO_2$ nanoparticles and then washing and drying the obtained $Fe_3O_4$-TDI-$TiO_2$ nanoparticles. In an example, the $Fe_3O_4$-TDI-$TiO_2$ nanoparticles may be washed with a solvent such as acetone and then dried at a temperature of approximately 100° C. for about 4 hours.

Referring to FIG. 1, according to one or more implementations, the step 103 of sulfonating the $Fe_3O_4$-TDI-$TiO_2$ nanoparticles to obtain $Fe_3O_4$-TDI-$TiO_2$—$SO_3H$ nanoparticles may include sulfonating the $Fe_3O_4$-TDI-$TiO_2$ nanoparticles by dispersing the $Fe_3O_4$-TDI-$TiO_2$ in a third dried solvent, such as dried dichloromethane, to obtain a second dispersion; adding chlorosulfonic acid to the second dispersion in a drop-wise manner; and removing the third dried solvent by, for example, a rotary evaporator under vacuum to obtain $Fe_3O_4$-TDI-$TiO_2$—$SO_3H$ nanoparticles.

According to an implementation, dispersing the $Fe_3O_4$-TDI-$TiO_2$ in a third dried solvent to obtain a second dispersion may include dispersing the $Fe_3O_4$-TDI-$TiO_2$ in the third dried solvent in an amount to obtain the second dispersion with a concentration of between 0.05 and 0.067 g/mL.

According to some implementations, adding chlorosulfonic acid to the second dispersion in a drop-wise manner may include drop-wise addition of chlorosulfonic acid to the second dispersion over a period of approximately 30 minutes with an addition rate between, for example, 0.008 and 0.01 mL/min. According to an implementation, adding chlorosulfonic acid to the second dispersion in a drop-wise manner may further include continuously stirring the second dispersion upon completion of the drop-wise addition of the chlorosulfonic acid for approximately one hour to allow complete evolution of HCl from the second dispersion.

According to some implementations, after removing the third dried solvent under the vacuum to obtain $Fe_3O_4$-TDI-$TiO_2$—$SO_3H$ nanoparticles, the obtained $Fe_3O_4$-TDI-$TiO_2$—$SO_3H$ nanoparticles may be washed with a solvent such as an ethanol solution to remove the unreacted acid and then dried at a temperature of approximately 100° C. for about 5 hours.

Referring to FIG. 1, according to one or more implementations, the step 104 of preparing a first polymer solution may include dissolving a polymer such as sulfonated polyphtalazinone (SPP), sulfonated polyphtalazinone ether ketone (SPPEK), sulfonated poly(ether sulfone) (SPES), or poly(vinyl alcohol) (PVA), sulfonated poly vinylidene fluoride (SPVDF) in a fourth solvent such as DMAc, N-methyl-2-pyrrolidone (NMP), or dimethyl sulfoxide (DMSO) under continuous stirring. Dissolving the polymer in the fourth solvent may be carried out under continuous stirring at room temperature. In an example, the first polymer solution may be prepared by dissolving SPEEK in DMAc. SPEEK may be obtained by direct sulfonation of PEEK. To this end, PEEK may be dried in a vacuum oven at a temperature of approximately 60° C. and then the dried PEEK may be slowly added to a concentrated sulfuric acid solution under vigorous stirring at room temperature. After complete dissolution of PEEK in the acid solution, the temperature of the resultant solution may be raised to a temperature of approximately 60° C. under vigorous stirring and the resultant solution may be kept at this temperature for about 4 hours. After that the solution may be cooled back to room temperature. The cooled solution may then be slowly added to a large excess of iced cold water under stirring to obtain a precipitate. The precipitate may then be washed with deionized water until neutral pH and then dried at a temperature of approximately 70° C. in a vacuum oven.

Still referring to FIG. 1, according to one or more implementations, the step 105 of dispersing the $Fe_3O_4$-TDI-$TiO_2$—$SO_3H$ nanoparticles into the first polymer solution to obtain a second homogenous solution may include adding the $Fe_3O_4$-TDI-$TiO_2$—$SO_3H$ nanoparticles into the first polymer solution and sonicating the first polymer solution for about 1 hour. According to an implementation the second homogeneous solution may have a concentration of between 3 and 7 wt % based on the total weight of the second homogeneous solution.

Still referring to FIG. 1, according to one or more implementations, the step 106 of casting and drying the second homogenous solution to obtain a nanocomposite membrane may include casting the second homogenous solution onto a glass plate and then drying the cast second homogenous solution at room temperature for about 12 hours followed by drying at a temperature of approximately 70° C. for about 12 hours.

Example 1: Synthesizing n-$Fe_3O_4$-TDI-$TiO_2$—$SO_3H$ Nanoparticles

In this example, $Fe_3O_4$-TDI-$TiO_2$—$SO_3H$ nanoparticles are synthesized, pursuant to the teachings of the present disclosure. To this end, 1.0 g of $Fe_3O_4$ nanoparticles and 1.40 g of TDI were dissolved in 50 mL dried toluene in an ultrasonic bath for 10-15 minutes. The reaction mixture was magnetically stirred at 95° C. for about 20 hours under a nitrogen atmosphere. The powder product was separated magnetically and was carefully washed with dry toluene to remove the unreacted and physically absorbed TDI and was dried under vacuum at 100° C. for about 4 hours. After that, 1.0 g of $Fe_3O_4$-TDI was dispersed in 100 mL of dried toluene. 0.3 gr of $TiO_2$ was added and the dispersion was heated at 110° C. for about 48 hours under constant stirring. The product, $Fe_3O_4$-TDI-$TiO_2$, was separated using a permanent magnet, washed with acetone and dried at 100° C. for about 4 hours. In order to immobilize chlorosulfonic acid, 1.0 gr of $Fe_3O_4$-TDI-$TiO_2$ nanoparticles were dispersed in 15 mL of dry $CH_2Cl_2$. Chlorosulfonic acid (0.25 mL, 3.75 mmol) was added in a drop-wise manner at room temperature over a period of about 30 minutes. Upon completing the drop-wise addition, the mixture was continuously stirred for an hour to allow complete evolution of HCl from the reaction mixture. Then, the solvent was removed under reduced pressure and the powder was washed three times with ethanol (10 mL) to remove the unattached acid and was dried at 100° C. for about 5 hours.

Figure 2:
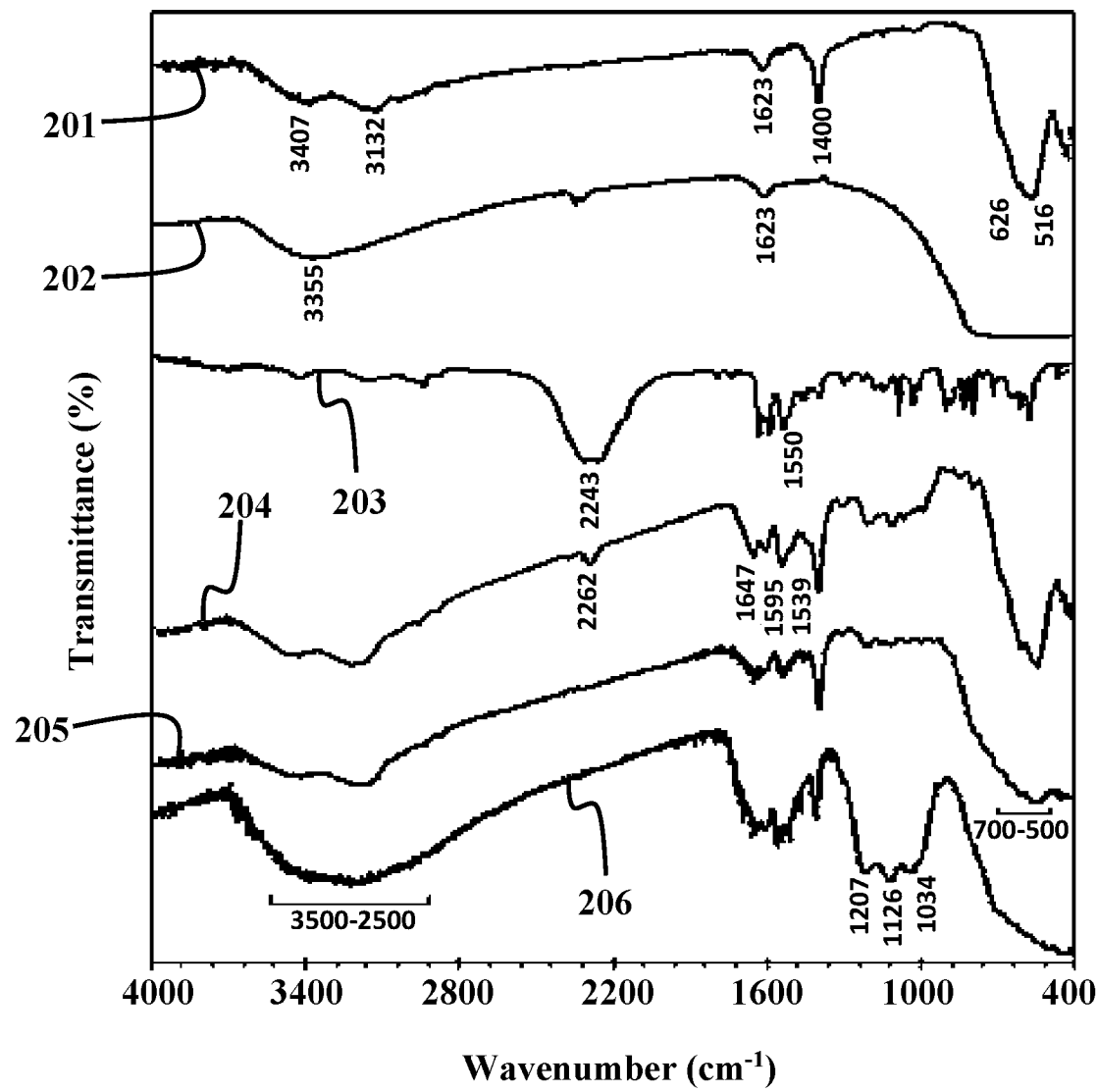
FIG. 2 illustrates Fourier-transform infrared (FT-IR) spectra of $Fe_3O_4$ nanoparticles, $TiO_2$ nanoparticles, TDI, $Fe_3O_4$-TDI nanoparticles, $Fe_3O_4$-TDI-$TiO_2$ nanoparticles, and $Fe_3O_4$-TDI-$TiO_2$-$SO_3H$ nanoparticles, according to one or more implementations of the present disclosure.

FIG. 2 illustrates Fourier-transform infrared (FT-IR) spectra of $Fe_3O_4$ nanoparticles (spectrum 201), $TiO_2$ nanoparticles (spectrum 202), TDI (spectrum 203), $Fe_3O_4$-TDI nanoparticles (spectrum 204), $Fe_3O_4$-TDI-$TiO_2$ nanoparticles (spectrum 205), and $Fe_3O_4$-TDI-$TiO_2$-$SO_3H$ nanoparticles (spectrum 206). Referring to FIG. 2, FT-IR spectra of every step of $Fe_3O_4$-TDI-$TiO_2$-$SO_3H$ nanoparticles synthesis are shown. Comparing spectrum 205 of $Fe_3O_4$-TDI-$TiO_2$ nanoparticles with spectrum 201 of $Fe_3O_4$ nanoparticles shows that new peaks have appeared at 2262, 1647, 1595, 1539, and 500-700 cm$^{-1}$; considering spectra 202 and 203, it is suggested that the appearance of these new peaks relates to a successful anchorage of the TDI and TiO$_2$ nanoparticles onto the surface of Fe$_3$O$_4$ nanoparticles. Referring to spectrum 206, immobilization of chlorosulfonic acid on the TiO$_2$ surface is verified by the broad band of the acidic group from 2800 to 3500 700 cm$^{-1}$ and in the absorption range of 1034-1267 700 cm$^{-1}$, which is related to O=S=O asymmetric and symmetric stretching.

Figure 3A:
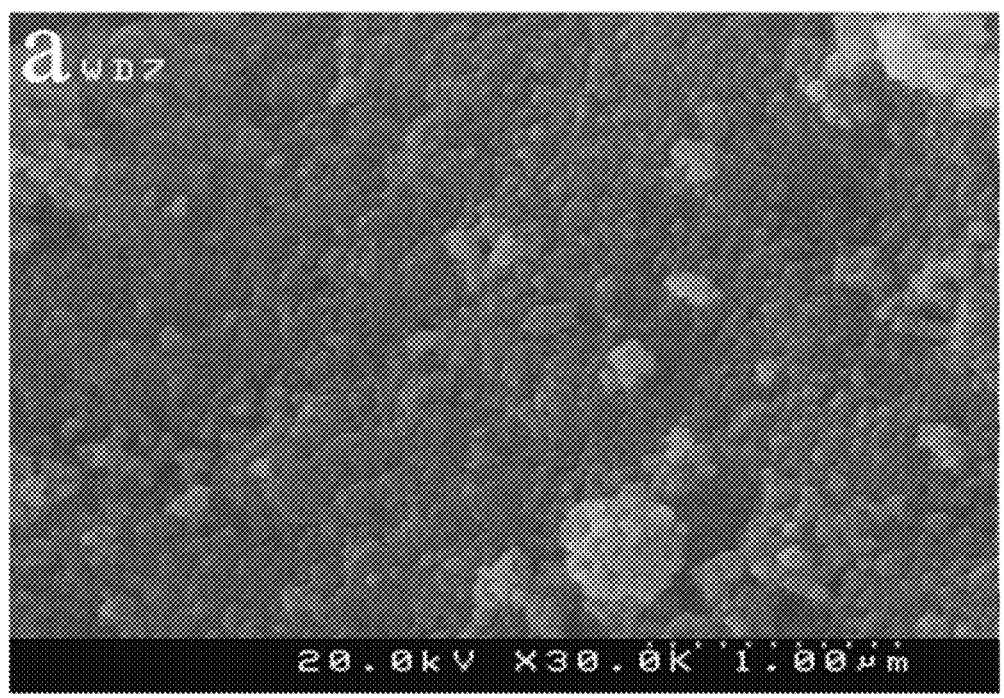
FIG. 3A is a field emission scanning electron microscope (FE-SEM) image $Fe_3O_4$ nanoparticles, according to an implementation of the present disclosure.
Figure 3B:
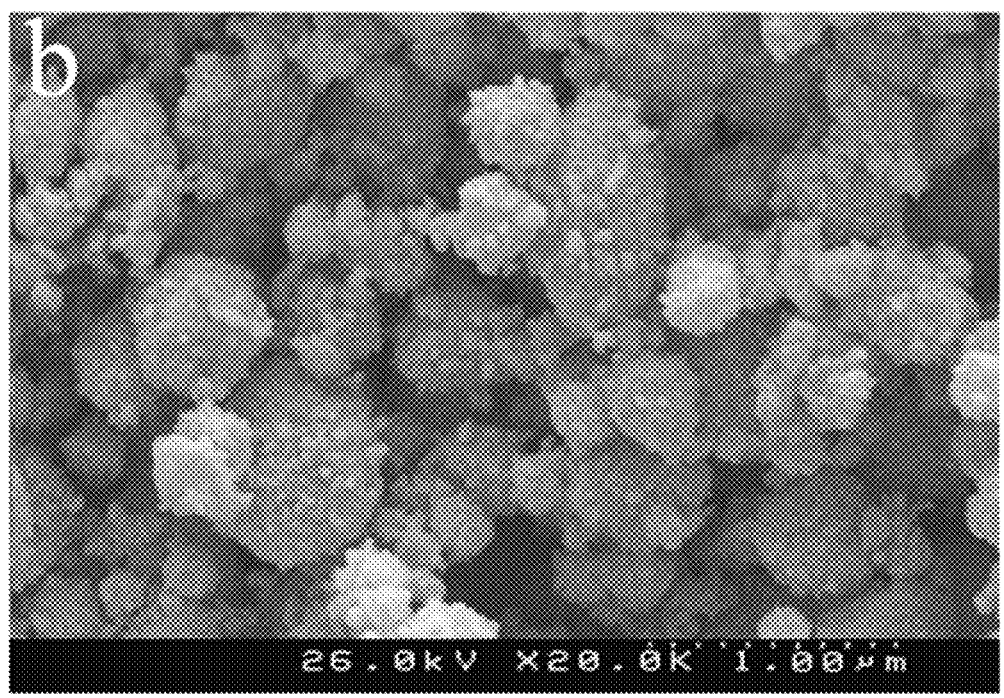
FIG. 3B is an FE-SEM image of $TiO_2$ nanoparticles, according to an implementation of the present disclosure.
Figure 3C:
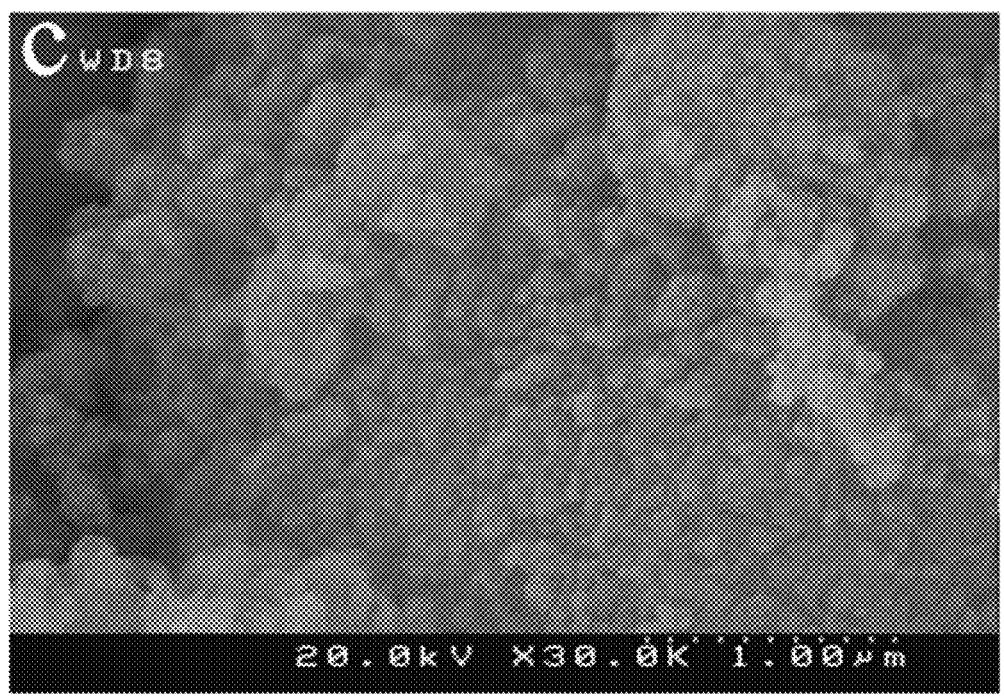
FIG. 3C is an FE-SEM image of $Fe_3O_4$-TDI-$TiO_2$ nanoparticles, according to an implementation of the present disclosure.
Figure 3D:
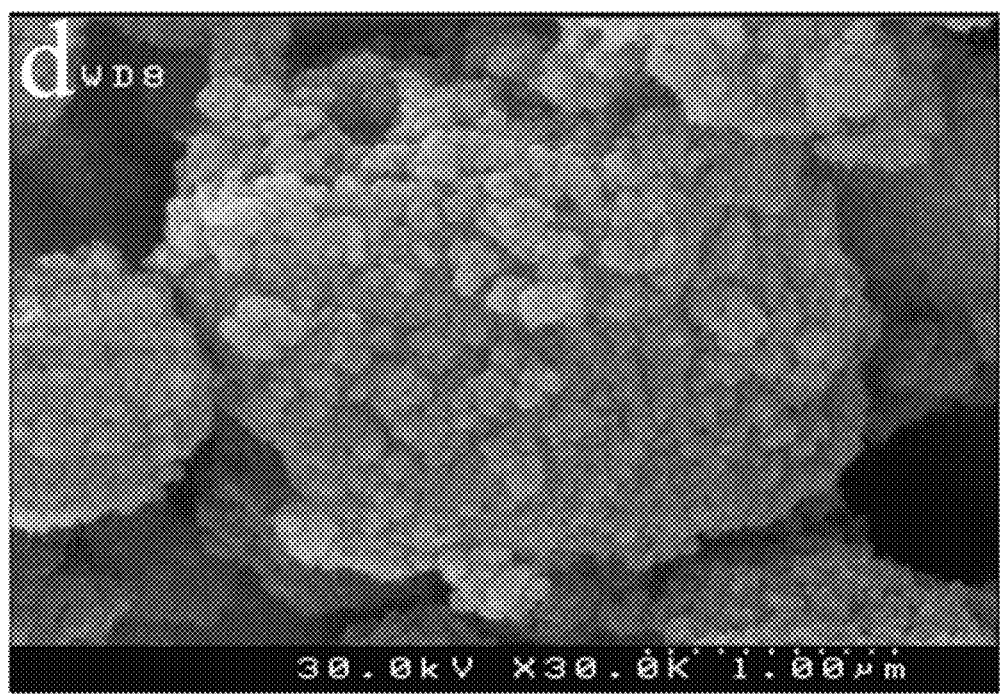
FIG. 3D is an FE-SEM image of $Fe_3O_4$-TDI-$TiO_2$-$SO_3H$ nanoparticles, according to an implementation of the present disclosure.

FIG. 3A is a field emission scanning electron microscope (FE-SEM) image of Fe$_3$O$_4$ nanoparticles. FIG. 3B is an FE-SEM image of TiO$_2$ nanoparticles. FIG. 3C is an FE-SEM image of Fe$_3$O$_4$-TDI-TiO$_2$ nanoparticles. FIG. 3D is an FE-SEM image of Fe$_3$O$_4$-TDI-TiO$_2$-SO$_3$H nanoparticles. Referring to FIG. 3D, Fe$_3$O$_4$-TDI-TiO$_2$-SO$_3$H nanoparticles are quasi-spherical with a larger average diameter in comparison to those of Fe$_3$O$_4$ nanoparticles (FIG. 3A) and TiO$_2$ nanoparticles (FIG. 3B). However, aggregation of the nanoparticles is observed, which occurs during the functionalization process.

Figure 4:
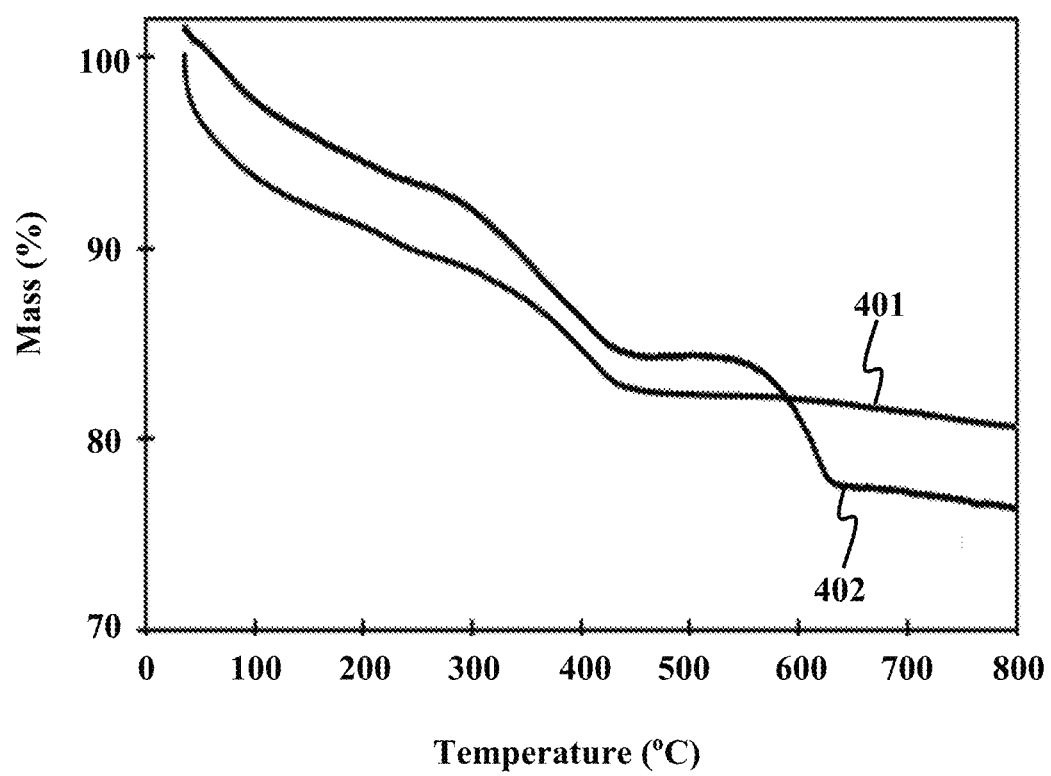
FIG. 4 illustrates thermogravimetric analysis (TGA) curves of $Fe_3O_4$-TDI-$TiO_2$ nanoparticles and $Fe_3O_4$-TDI-$TiO_2$-$SO_3H$ nanoparticles, according to an implementation of the present disclosure.

FIG. 4 illustrates thermogravimetric analysis (TGA) curves of Fe$_3$O$_4$-TDI-TiO$_2$ nanoparticles (curve 401) and Fe$_3$O$_4$-TDI-TiO$_2$-SO$_3$H nanoparticles (curve 402). Referring to FIG. 4, the TGA curve 402 of Fe$_3$O$_4$-TDI-TiO$_2$-SO$_3$H nanoparticles exhibits three mass losses in 30-150, 150-460 and 460-650° C. which were attributed to the thermal decomposition of TDI and sulfonic acid groups.

The quantity of sulfonic acid groups on the surface of Fe$_3$O$_4$-TDI-TiO$_2$-SO$_3$H was determined using ion-exchange pH analysis. According to the obtained results, the loading of acidic sites was about 2.70 mmol of H$^+$ per each gram of the Fe$_3$O$_4$-TDI-TiO$_2$-SO$_3$H.

Example 2: Preparing SPEEK/n-Fe$_3$O$_4$-TDI-TiO$_2$—SO$_3$H Nanocomposite Membranes In this example, three SPEEK/n-Fe$_3$O$_4$-TDI-TiO$_2$—SO$_3$H membrane samples containing different amounts of n-Fe$_3$O$_4$-TDI-TiO$_2$—SO$_3$H nanoparticles were synthesized, pursuant to the teachings of the present disclosure. To this end, PEEK was dried for 24 hours in a vacuum oven at 60° C. before sulfonation. The dried PEEK (1 g) was slowly added into 10 mL of concentrated sulfuric acid under vigorous stirring for about 1 hour at room temperature. After complete dissolution of PEEK, the temperature of the solution was raised to 60° C. with vigorous stirring for about 4 hours and then cooled to room temperature. After that, the cooled solution was slowly added to a large excess of iced cold water under stirring. The precipitate was then washed with deionized water until neutral pH and then dried at 70° C. in a vacuum oven.

Three membranes (SPEEK/n-Fe$_3$O$_4$-TDI-TiO$_2$—SO$_3$H) were prepared and named MSFx, where x present the weight percent of nanoparticles (3, 5 and 7) in the membrane. First, appropriate amount of SPEEK was dissolved in dimethyl formamide (DMAc) under stirring conditions at room temperature. Then, an appropriate amount of n-Fe$_3$O$_4$-TDI-TiO$_2$—SO$_3$H nanoparticles was added to the resulting solution and sonicated for about 1 hour. The resulting homogeneous solution was casted onto a clean glass plate, successively dried at room temperature for about 12 hours and 70° C. for about 12 hours. Also, the SPEEK membrane was prepared with a similar method without addition of nanoparticles and named the MS membrane.

Figure 5:
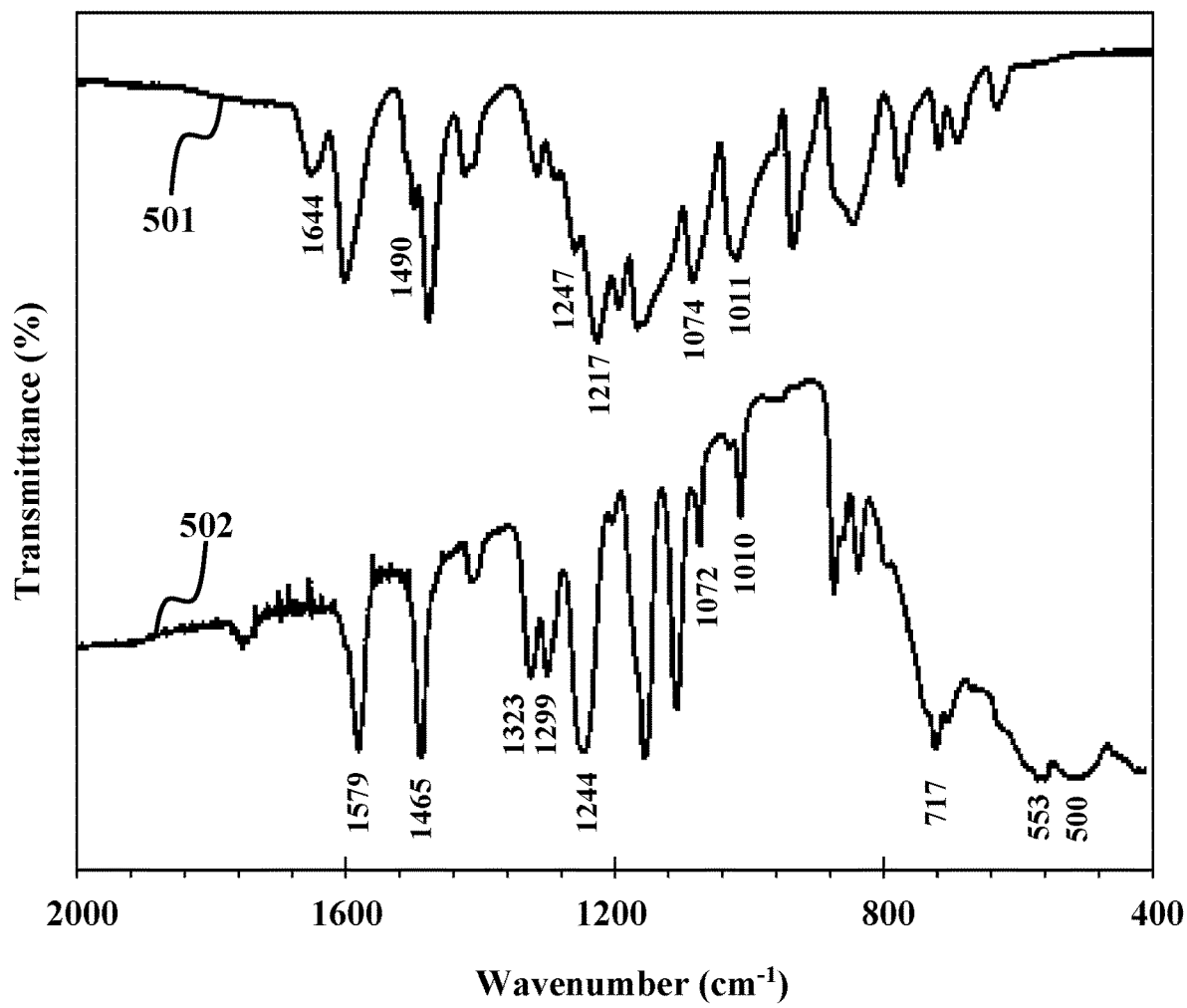
FIG. 5 illustrates FT-IR spectra of the MS membrane and MSF5 membrane, according to an implementation of the present disclosure.

FIG. 5 illustrates FT-IR spectra of the MS membrane (spectrum 501) and MSF5 membrane (spectrum 502). Referring to spectrum 501 of the MS membrane, bands at 1217 and 1490 cm$^{-1}$ are typical of C—O—C and C—C aromatic ring in the SPEEK. The absorption peaks at 1011, 1074 and 1247 cm$^{-1}$ are assigned to the asymmetric and symmetric stretching vibration of O=S=O and stretching vibration of S=O on sulfonic acid groups in SPEEK and the absorption peak at 1644 cm$^{-1}$ corresponds to the carbonyl groups of SPEEK. Referring to spectrum 502 of MSF5 membrane, the peaks at 500-800 cm$^{-1}$ in spectrum 502 differs from the peaks at 500-800 cm$^{-1}$ in spectrum 501, due to the presence of Ti—O and Fe—O stretching vibrations. The difference in form and vibration intensity of asymmetric and symmetric O=S=O bond in the range of 1010-1323 cm$^{-1}$ is due to the addition of sulfonic acid groups of nanoparticles to the SPEEK polymer.

Figure 6A:
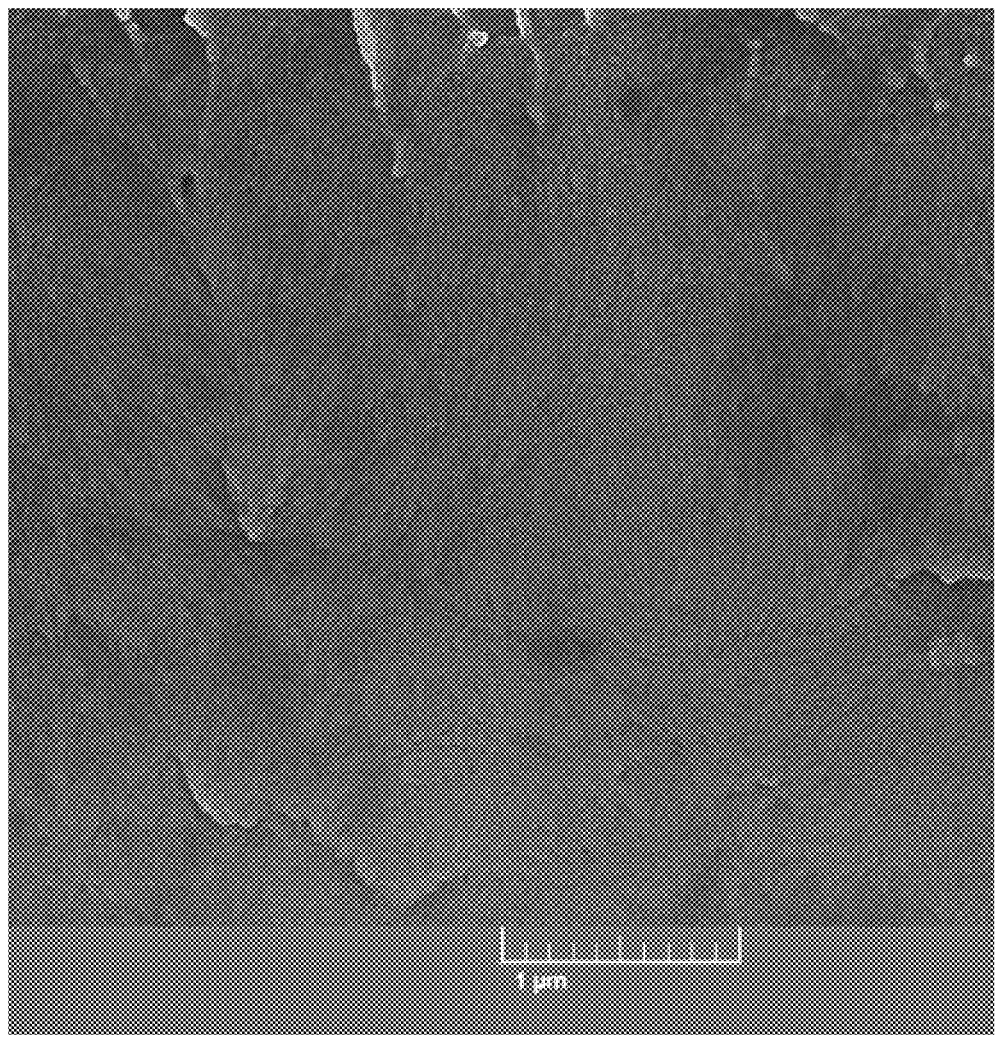
FIG. 6A is a scanning electron microscope (SEM) image of the MS nanocomposite membrane, according to an implementation of the present disclosure.
Figure 6B:
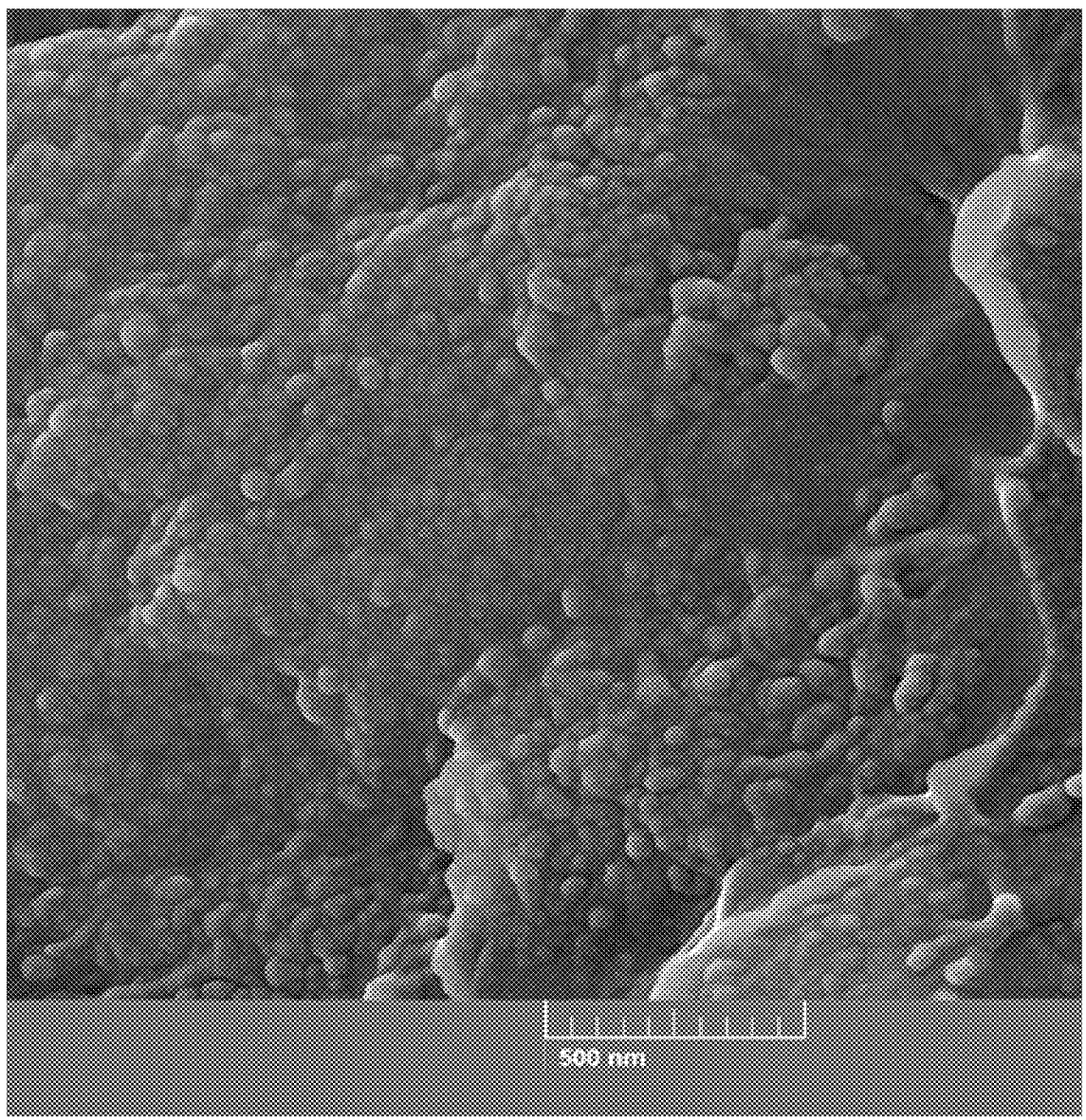
FIG. 6B is an SEM image of the MSF5 nanocomposite membrane, according to an implementation of the present disclosure.

FIG. 6A is a scanning electron microscope (SEM) image of the MS nanocomposite membrane. FIG. 6B illustrates an SEM image of the MSF5 nanocomposite membrane. Referring to FIGS. 6A and 6B, the MS membrane had a fairly smooth surface, which indicated a strong sticky force between the SPEEK chains. By adding nanoparticles to the SPEEK chains, the roughness of the membrane was increased. Spherical nanoparticles were visible on the membrane.

The DMFC performance was investigated by measuring the polarization curves of membrane MEA. The MEA (3.6×3.6 cm) was fabricated by painting method, which contains coating of catalyst on the electrode. The Pt/Ru/C catalyst was used as the anode electrode and Pt/C catalyst was used as the cathode electrode in the MEA. The catalyst inks were obtained by mixing the prepared catalysts with isopropyl alcohol, deionized water and 15 wt % of Nafion binder solution. Total of 4 mg cm−2 of the Pt/C and Pt/Ru/C catalysts were coated onto carbon electrodes (E-tek, HT 2500-W). Finally, the MEA was obtained by hot-pressing of different membranes with anode and cathode prepared electrodes at 120° C. and pressure of 135 kg cm-2 for 3 min. A 2 M methanol was pumped with a flow rate of 3 mL min−1 into the anode and pure oxygen gas was supplied with a flow rate of 300 mL min−1 into the cathode under ambient pressure. The DMFC performance was calculated at 30° C. after activation process.

Table 1 presents ion-exchange capacity (IEC), water uptake (WU), and membrane swelling (SW) of the synthesized membranes. WU and SW are very important parameters for proton conducting polymer membranes. Referring to Table 1, addition of nanoparticles to the membrane increases the water uptake of the nanocomposite membrane compared to an MS membrane due to the formation of hydrogen bonding between —SO$_3$H groups of nanoparticles and free water molecules and increasing hydrophilic nature of the nanocomposite membranes. At the same time, the membrane swelling of the nanocomposite membranes decreases by the addition of Fe$_3$O$_4$-TDI-TiO$_2$—SO$_3$H nanoparticles. The functionalized groups on the surface of the nanoparticles and membrane increase hydrogen bonds and therefore the structure of the membrane is compressed, and the membrane swelling is reduced.

The ion exchange capacity (IEC) is a measure of the ability of ion exchanging and ion transferring groups of membranes. The IEC value plays an important role for determination of membrane proton conductivity.

TABLE 1

Comparison of the ion-exchange capacity (IEC), water uptake (WU) and membrane swelling (SW) of prepared membranes

| Membrane | WU (%) | SW (%) | IEC |
|---|---|---|---|
| MS | 38 | 14.9 | 1.61 |
| MSF3 | 15.51 | 7.11 | 1.18 |
| MSF5 | 17.64 | 4.31 | 1.06 |
| MSF7 | 19.8 | 3.88 | 0.97 |

Proton conductivity is the most important parameter for proton exchange membranes (PEM) in DMFCs. Two kinds of proton transport mechanisms exist in PEMs. First, proton transfer by means of hopping from one proton conducting site ($H_3O^+SO_3^-$) to another which is referred to as the Grotthus mechanism. Second, proton attachment to free water molecules and diffuse as a whole throughout membrane which is referred to as the Vehicle mechanism. The sulfonic acid groups play an important role in proton transfer in the Grotthuss mechanism, while water molecules are essential in both mechanisms.

Table 2 presents the results of proton conductivity, methanol permeability, and selectivity of the synthesized membranes. The proton conductivity of MS membrane was 0.042 $Scm^{-1}$ and increased to 0.081 $Scm^{-1}$ when the nanoparticles were added. In the MSFx membrane, the sulfonic acid groups of nanoparticles interact with free water molecules, forming a network of hydrogen bonds which increase proton conductivity of the membranes by Grotthus mechanism. In addition, the surface hydroxyl groups of nanoparticles could create hydrogen bonding with free water molecules, increasing the proton conductivity via the Vehicle mechanism. By increasing the percentage of nanoparticles above 5 wt % in the nanocomposite membrane, the conductivity of proton in the membrane is reduced due to the accumulation of nanoparticles and the closure of proton transfer channels in the membrane.

TABLE 2

Comparison of the proton conductivity (σ), methanol permeability (P), and selectivity (S) of the synthesized membranes.

| Membrane | σ (S $cm^{-1}$) | P ($cm^2 s^{-1}$) | S (S $s^{-1} cm^{-3}$) |
|---|---|---|---|
| MS | 0.042 | 7.36 × $10^{-7}$ | 5.70 × $10^4$ |
| MSF3 | 0.064 | 4.31 × $10^{-7}$ | 1.48 × $10^4$ |
| MSF5 | 0.081 | 3.35 × $10^{-7}$ | 2.41 × $10^4$ |
| MSF7 | 0.070 | 2.93 × $10^{-7}$ | 2.38 × $10^4$ |

Methanol barrier property of membranes is essential for DMFCs for reduction of catalyst poisoning and increase of membrane performance. Therefore, for practical uses of PEMs in DMFCs, the PEMs should have low methanol permeability. To make sure that the prepared membranes are suitable for DMFC application, the methanol permeability of MS, MSF3, MSF5 and MSF7 membranes were measured as a function of time at room temperature. Referring to Table 2, the MS membrane had the highest methanol permeability (7.36×10-7 $cm^2/s$) and the methanol permeability was decreased by adding n-$Fe_3O_4$@TDI@$TiO_2$—$SO_3H$ nanoparticles. The nanoparticles have a filler effect which fill more pores and result in low passage of methanol. Also, increasing the compression of the membrane structure with hydrogen bonding between the polymer and nanoparticles reduces the penetration of methanol into the membrane structure. Generally, as the percentage of nanoparticles increases, the structure of the nanocomposite becomes more compact and the methanol permeability decreases.

The proton conductivity and methanol permeability could greatly influence the performance of membranes in DMFCs. The PEMs applied in DMFCs should possess simultaneously low methanol permeability and high proton conductivity. Referring to Table 2, the MSF5 membrane shows better selectivity than MS membranes because of significant higher proton conductivity and lower methanol permeability. Therefore, this membrane has the highest potential among the synthesis membranes for applying in DMFCs.

TABLE 3

Mechanical properties of the synthesized membranes at room temperature.

| Membrane | TS (MPa) | Eb (%) |
|---|---|---|
| MS | 18.72 | 11.51 |
| MSF3 | 27.43 | 7.87 |
| MSF5 | 34.87 | 6.12 |
| MSF7 | 38.91 | 4.83 |

Table 3 presents tensile strength (TS) and elongation at break (Eb) measured for the synthesized membranes at room temperature. The TS of the MS membrane (18.72 MPa) was increased by adding nanoparticles to 27.43 MPa due to the formation of a strong hydrogen bond between the polymer and nanoparticles and the compacting of the MSFx membranes structure relative to the MS.

While the foregoing has described what are considered to be the best mode and/or other examples, it is understood that various modifications may be made therein and that subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study, except where specific meanings have otherwise been set forth herein. Relational terms such as "first" and "second" and the like may be used solely to distinguish one entity or action from another without necessarily requiring or implying any actual such relationship or order between such entities or actions. The terms "comprises," "comprising," or any other variation thereof, as used herein and in the appended claims are intended to cover a non-exclusive inclusion, encompassing a process, method, article, or apparatus that comprises a list of elements that does not include only those elements but may include other elements not expressly listed to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is not intended to be used to interpret or limit the scope or meaning of the claims. In addition, in the foregoing Detailed Description, it can be seen that various features are grouped together in various implementations. Such grouping is for purposes of streamlining this disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into this Detailed Description, with each claim standing on its own as a separately claimed subject matter.

While various implementations have been described, the description is intended to be exemplary, rather than limiting and it will be apparent to those of ordinary skill in the art that many more implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for synthesizing a nanocomposite membrane, the method comprising:
    preparing $Fe_3O_4$-tolylene di-isocyanate (TDI) nanoparticles by reacting $Fe_3O_4$ nanoparticles and TDI powder, comprising:
        obtaining a mixture by dissolving the $Fe_3O_4$ nanoparticles and the TDI powder in a first dried solvent; and
        obtaining an $Fe_3O_4$-TDI powder by stirring the mixture under an inert atmosphere;
    preparing $Fe_3O_4$-TDI-$TiO_2$ nanoparticles by:
        obtaining a first dispersion by dispersing the $Fe_3O_4$-TDI powder in a second dried solvent;
        adding $TiO_2$ nanoparticles to the first dispersion; and
        heating the first dispersion under continuous stirring;
    sulfonating the $Fe_3O_4$-TDI-$TiO_2$ nanoparticles by:
        obtaining a second dispersion by dispersing the $Fe_3O_4$-TDI-$TiO_2$ nanoparticles in a third dried solvent;
        adding chlorosulfonic acid to the second dispersion in a drop-wise manner; and
        obtaining $Fe_3O_4$-TDI-$TiO_2$-$SO_3H$ nanoparticles by removing the third dried solvent;
    preparing a first polymer solution;
    obtaining a second homogenous solution by dispersing the $Fe_3O_4$-TDI-$TiO_2$-$SO_3H$ nanoparticles into the first polymer solution; and
    obtaining the nanocomposite membrane by casting and drying the second homogenous solution.

2. The method according to claim 1, wherein dissolving $Fe_3O_4$ nanoparticles and TDI powder in the first dried solvent includes dissolving $Fe_3O_4$ nanoparticles and TDI powder in the first dried solvent with an $Fe_3O_4$ to TDI mass ratio ($Fe_3O_4$:TDI) of between 6:10 and 8:10.

3. The method according to claim 1, wherein stirring the mixture under the inert atmosphere includes stirring the mixture at a temperature of approximately 95° C. for 20 hours under a nitrogen atmosphere.

4. The method according to claim 1, wherein dispersing the $Fe_3O_4$-TDI powder in the second dried solvent to obtain the first dispersion includes dispersing 0.0067 g to 0.01 g of the $Fe_3O_4$-TDI powder in each mL of the second dried solvent to obtain the first dispersion.

5. The method according to claim 1, wherein adding the $TiO_2$ nanoparticles to the first dispersion includes adding the $TiO_2$ nanoparticles to the first dispersion with a $TiO_2$ to $Fe_3O_4$-TDI mass ratio ($TiO_2$:$Fe_3O_4$-TDI) of approximately 3:10.

6. The method according to claim 1, wherein heating the first dispersion under continuous stirring comprises heating the first dispersion at a temperature of 110° C. for 48 hours under continuous stirring.

7. The method according to claim 1, wherein dispersing the $Fe_3O_4$-TDI-$TiO_2$ in the third dried solvent to obtain the second dispersion comprises dispersing between 0.05 g and 0.067 g of the $Fe_3O_4$-TDI-$TiO_2$ in each mL of the third dried solvent.

8. The method according to claim 1, wherein adding chlorosulfonic acid to the second dispersion in a drop-wise manner comprises drop-wise addition of chlorosulfonic acid to the second dispersion with an addition rate between 0.008 and 0.01 mL/min.

9. The method according to claim 1, wherein preparing the first polymer solution includes dissolving a polymer in a fourth solvent, the polymer comprising one of polyphtalazinone (SPP), sulfonated polyphtalazinone ether ketone (SPPEK), sulfonated poly(ether sulfone) (SPES), and poly (vinyl alcohol) (PVA), sulfonated poly vinylidene fluoride (SPVDF), the fourth solvent comprising one of DMAc, N-methyl-2-pyrrolidone (NMP), and dimethyl sulfoxide (DMSO).

10. The method according to claim 1, wherein dispersing the $Fe_3O_4$-TDI-$TiO_2$-$SO_3H$ nanoparticles into the first polymer solution comprises dispersing the $Fe_3O_4$-TDI-$TiO_2$-$SO_3H$ nanoparticles into the first polymer solution to obtain the second homogenous solution with a concentration of between 3 and 7 wt % based on the total weight of the second homogeneous solution.

\* \* \* \* \*